United States Patent
Giura

(10) Patent No.: US 11,206,283 B2
(45) Date of Patent: *Dec. 21, 2021

(54) SECURITY MANAGEMENT OF DEVICES USING BLOCKCHAIN TECHNOLOGY

(71) Applicant: AT&T Intellectual Property I, L.P., Atlanta, GA (US)

(72) Inventor: Paul Giura, Cohoes, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/227,441

(22) Filed: Apr. 12, 2021

(65) Prior Publication Data
US 2021/0234888 A1    Jul. 29, 2021

Related U.S. Application Data

(63) Continuation of application No. 16/029,830, filed on Jul. 9, 2018, now Pat. No. 10,979,445.

(51) Int. Cl.
*H04L 29/06* (2006.01)
*G06F 8/65* (2018.01)

(52) U.S. Cl.
CPC .......... *H04L 63/1433* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 9,244,673 B2 | 1/2016 | Chinn et al. | |
| 9,792,742 B2 | 10/2017 | Johnson et al. | |
| 9,832,026 B2 | 11/2017 | Kravitz et al. | |
| 9,849,364 B2 | 12/2017 | Tran et al. | |
| 2017/0046709 A1 | 2/2017 | Lee et al. | |
| 2017/0279818 A1* | 9/2017 | Milazzo | H04L 63/1433 |
| 2017/0366347 A1 | 12/2017 | Smith | |
| 2018/0088924 A1 | 3/2018 | Pirzadeh et al. | |
| 2018/0088928 A1 | 3/2018 | Smith et al. | |
| 2018/0094953 A1 | 4/2018 | Colson et al. | |
| 2018/0097695 A1 | 4/2018 | Bender et al. | |
| 2018/0109541 A1 | 4/2018 | Gleichauf | |

(Continued)

OTHER PUBLICATIONS

Liu et al., Blockchain for Data Science, 2020, ICBCT'20, Mar. 12-14, 2020, Hilo, HI, USA, pp. 24-28 (Year: 2020).*

(Continued)

*Primary Examiner* — Luu T Pham
*Assistant Examiner* — Edward X Long
(74) *Attorney, Agent, or Firm* — Hartman & Citrin LLC

(57) ABSTRACT

Concepts and technologies disclosed herein are directed to security management of devices using blockchain technology. According to one aspect disclosed herein, a smart contract for a device can be created. The smart contract can identify a plurality of parties including a device customer, a device manufacturer, and a vulnerability assessor. The smart contract can include an expected action to be performed by the device manufacturer responsive to a trigger event. In response to the trigger event being detected, the smart contract can be executed to cause the expected action to be performed by the device manufacturer.

12 Claims, 5 Drawing Sheets

(56) References Cited

U.S. PATENT DOCUMENTS

2019/0196981 A1\* 6/2019 Silvert .................. G06F 3/0622
2019/0349426 A1\* 11/2019 Smith ................... H04L 67/104

OTHER PUBLICATIONS

Wang et al., Security Control Components for Epidemic Prevention Donation Management Blockchain, 2020, BSCI'20, pp. 73-84. (Year: 2020).\*
Kosba et al., "Hawk: The Blockchain Model of Cryptography and Privacy-Preserving Smart Contracts," 2016 IEEE Symposium on Security and Privacy, pp. 839-858 (Year: 2016).
Shuaib et al., "Using Blockchains to Secure Distributed Energy Exchange," 2018 $5^{th}$ International Conference on Control Decision and Information Technologies, pp. 622-627 (Year: 2018).
U.S. Office Action dated May 13, 2020 in U.S. Appl. No. 16/029,830.
U.S. Notice of Allowance dated Dec. 4, 2020 in U.S. Appl. No. 16/029,830.

\* cited by examiner

SECURITY MANAGEMENT OF DEVICES USING BLOCKCHAIN TECHNOLOGY

CROSS-REFERENCE TO RELATED APPLICATIONS

This application is a continuation of and claims priority to U.S. patent application Ser. No. 16/029,830, entitled "Security Management of Devices Using Blockchain Technology," filed Jul. 9, 2018, now U.S. Pat. No. 10,979,445, which is incorporated herein by reference in its entirety.

BACKGROUND

Blockchain is emerging as a preeminent decentralized ledger and is receiving increasing attention from researchers, practitioners, organizations, and the public. Initially, blockchain was developed to address the "double spending" problem in cryptocurrencies, but recently, many new applications of blockchain have been proposed or are being developed. Blockchain allows sharing data in a decentralized, transparent and immutable way, using a peer-to-peer network, without the need to trust any particular entity.

Blockchain is receiving growing attention not just as the underlying technology of cryptocurrencies, but also as a public ledger in various domains. Financial institutions, for example, are examining the use of blockchain as a ledger for financial transactions to cut out the middleman to reduce costs and to expedite processing transactions. Blockchain also can be used to maintain digital assets, such as stocks, bonds, land titles, and the like. Stored transactions record the transfer of assets between users. Blockchain can store data and documents, either in full or merely a digest of the data (e.g., a cryptographic hash like SHA-256) to provide evidence of the existence of data or documents, such as contracts, patents, scientific publications, deeds, insurance policies, and the like. Blockchain also can be used for identity management through hashed features of a person (e.g., verifiable attributes of the person) stored with a public key or some other means to electronically sign documents, or access remote services to protect people from identity theft and fraudulent impersonation. Blockchain has the potential to provide a secure infrastructure for smart cities and could facilitate the creation of a marketplace of social data where people share their private data for public benefit. Blockchain also has commercial uses, such as for tracking diamonds from mines to market, managing data provenance in Internet of Things ("IoT") systems, providing transparency in product manufacturing and supply chain management, and supporting vehicle provenance.

SUMMARY

Concepts and technologies disclosed herein are directed to security management of devices using blockchain technology. According to one aspect disclosed herein, a smart contract for a device can be created. The smart contract can identify a plurality of parties including a device customer, a device manufacturer, and a vulnerability assessor. The smart contract can include an expected action to be performed by the device manufacturer responsive to a trigger event. In response to the trigger event being detected, the smart contract can be executed to cause the expected action to be performed by the device manufacturer.

In some embodiments, the trigger event can include a discovery of a security vulnerability of the device. The discovery of the security vulnerability of the device is made by the device customer, a service provider, or some other entity and made available by a vulnerability assessor. In these embodiments, the expected action can include a remediation of the security vulnerability. The security vulnerability can involve a software application of the device. The security vulnerability can involve an operating system of the device. The security vulnerability can involve a firmware of the device.

In some embodiments, the trigger event can include an availability of an update for the device. The update for the device can include a software application update, an operating system update, a firmware update, and/or a hardware update. In some other embodiments, the trigger event can include the device reaching an expected end-of-life.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
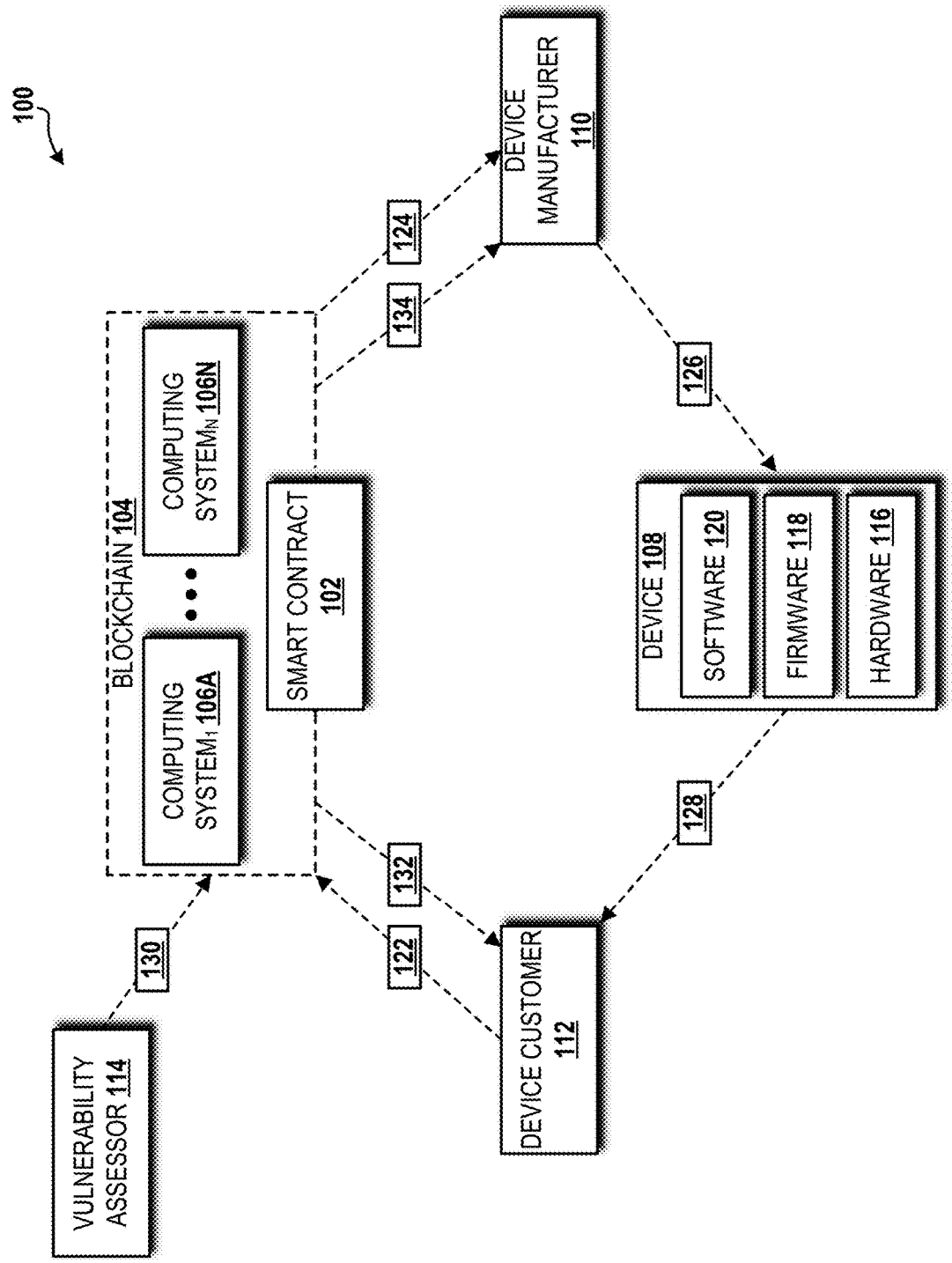
FIG. 1 is a block diagram illustrating an illustrative operating environment capable of implementing aspects of the concepts and technologies disclosed herein.

Many devices are brought to market in a rush to take advantage of the latest technological innovation and beat competition without proper security in place. There is a need for a secure, trusted solution to device lifecycle management from the moment a device is manufactured until the device reaches end-of-life. In general, Internet-connected devices require frequent updates to address newly-discovered vulnerabilities and/or to support new capabilities introduced by the manufacturer. However, in many cases, these updates are not performed, and the devices are left to function with vulnerabilities open to be exploited. Moreover, in many cases, the updates are not automatically triggered by any process and devices continue to be vulnerable until compromised, a device user triggers the updates, or the device reaches end-of-life. The concepts and technologies disclosed herein address the problem of device security accountability and propose an automatic method to establish the realization of security accountability via smart contracts between the device manufacturer and the device user, recorded in a distributed ledger, public (e.g., Ethereum) or private, using blockchain technology.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for security management of devices using blockchain technology will be described.

Turning now to FIG. 1, an operating environment 100 capable of implementing aspects of the concepts and technologies disclosed herein will be described. The operating environment 100 includes a smart contract 102 recorded on a blockchain 104 of which a plurality of computing systems 106A-106N (also referred to herein in the singular as a computing system 106 or in the plural as computing systems 106) are a part. The smart contract 102 defines obligations of an agreement among two or more parties and automatically enforces those obligations. Those skilled in the art will appreciate the smart contract 102 otherwise known as a self-executing contract, a blockchain contract, or a digital contract. The smart contract 102 includes computer code that is stored and replicated on the blockchain 104 and is supervised by the plurality of computing systems 106A-106N that run on the blockchain 104. The blockchain 104 is a digitized, decentralized, distributed ledger of transactions. In some embodiments, the blockchain 104 operates on a public blockchain-based computing platform, such as Ethereum, for example. In other embodiments, the blockchain operates on a private blockchain-based computing platform.

The operating environment 100 also includes a device 108 manufactured by a device manufacturer 110 and sold to a device customer 112. The device manufacturer 110 and the device customer 112 can be parties identified in the smart contract 102. In addition, a vulnerability assessor 114 can be identified as another party in the smart contract 102.

The smart contract 102 can include code that defines one or more expected actions to be performed by the device manufacturer 110 responsive to a trigger event, such as, for example, a trigger event of when the device 108 is sold, a trigger event of when a vulnerability is discovered, a trigger event of when an update is available, a trigger event of when a new feature is available, a trigger event of when an expected end-of-life is reached, or some other event trigger, and can automatically enforce one or more expected actions to be performed within a specified time frame. For example, if a security vulnerability is discovered and is not addressed by the device manufacturer 110 within 24 hours, then the device customer 112 (and/or a device owner if distinct) can be reimbursed monetarily or in some other way (e.g., free service or discounted service) in accordance with one or more obligations defined in the smart contract 102.

The device 108 is any device that includes hardware 116, firmware 118, and/or software 120. By way of example, and not limitation, the device 108 can be a router, switch, hub, modem, bridge, repeater, smartphone, tablet, consumer electronic device, Internet of Things ("IoT") device, personal computer, server computer, video game console, still camera, video camera, audio recording device, Global Positioning System ("GPS") device, personal data assistant ("PDA"), electronic reading device, smart watch, smart speaker, appliance, smart home device, home security device, vehicle entertainment device (also known as "infotainment"), vehicle electronic control unit ("ECU"), vehicle navigation system, any other networking device, any other end user device, any other enterprise device, combinations thereof, and the like.

The hardware 116 includes any physical component of the device 108. An individual hardware 116 component might include its own firmware 118 and/or software 120 that can be addressed by the smart contract 102 separate from other components. For example, a communications component, such as a cellular radio, might include firmware that can be updated separately from other firmware 118 and/or software 120 associated with the device 108. The firmware 118 can be software code that is embedded in the hardware 116 or some individual component thereof. The software 120 can include operating systems and software applications executable by the hardware 116.

The hardware 116, the firmware 118, and/or the software 120 can be subject to one or more security vulnerabilities during its lifecycle. The smart contract 102 can specify specific security vulnerabilities, categories of security vulnerabilities, or other specifications related to one or more security vulnerabilities the device 108 might encounter during its lifecycle. The smart contract 102 can include one or more expected actions to be performed by the device manufacturer 110 responsive to the discovery of one or more security vulnerabilities. For example, an expected action might include a remediation of a security vulnerability via an update to the hardware 116, the firmware 118, and/or the software 120. An update to the hardware 116 might require the device 108 to be returned to the device manufacturer 110 for the update, user-serviced in accordance with instructions provided, at least in part, by the device manufacturer 110, or serviced by a third party designated by the device manufacturer 110, for example. It is contemplated that the smart contact 102 can include obligations to address manufacture defects and/or other warranty-related issues. Additionally or alternatively, the smart contract 102 might include obligations to address damage to the device 108 or some component thereof.

Security vulnerabilities can be monitored by the vulnerability assessor 114. The vulnerability assessor 114 is a third party to the device manufacturer 110 and the device customer 112. Security vulnerabilities can also be discovered by the device customer 112, one or more users of the device 108, or reported by a third party, such as a researcher, vulnerability discloser, and/or information technology vendor. In any case, the entity that discovers and/or reports a security vulnerability can do so in accordance with a vulnerability assessment protocol. The smart contract 102 can specify a vulnerability assessment protocol. The smart contract 102 can publish a security vulnerability via the vulnerability assessor 114. In some embodiments, the vulnerability assessor 114 can be or can include a system such as a common vulnerability and exposures ("CVE") system.

The operating environment 100 also illustrates operations 122-134 that can be performed to implement the smart contract 102. At operations 122, 124, the device customer 112 can buy the device 108, and the device manufacturer 110 can sell the device 108 in accordance with the smart contract 102. The device customer 112 might be a business, an end user, or a reseller, and the obligations in the smart contract 102 can reflect any hierarchy that might exist. At operation 126, the device manufacturer 110 can ship the device 108 to the device customer 112 per the smart contract 102. At operation 128, the device customer 112 can register the device 108 per the smart contract 102. Registration can include registering the device 108 with the device manufacturer 110. Other forms of registration can include the device 108 being placed in-use with or without a service.

At operation 130, the vulnerability assessor 114 can report any vulnerabilities to the blockchain 104 in accordance with the smart contract 102. Operation 130 can be performed as an ongoing monitoring and reporting process. At operation 132, the device customer 112 can be compensated, in accordance with the smart contract 102, for any vulnerability reported by the vulnerability assessor 114. At operation 134, the device manufacturer 110 can perform one or more expected actions to be performed in response to a trigger event (e.g., discovery of a security vulnerability by the vulnerability assessor 114) defined in the smart contract 102.

Figure 2:
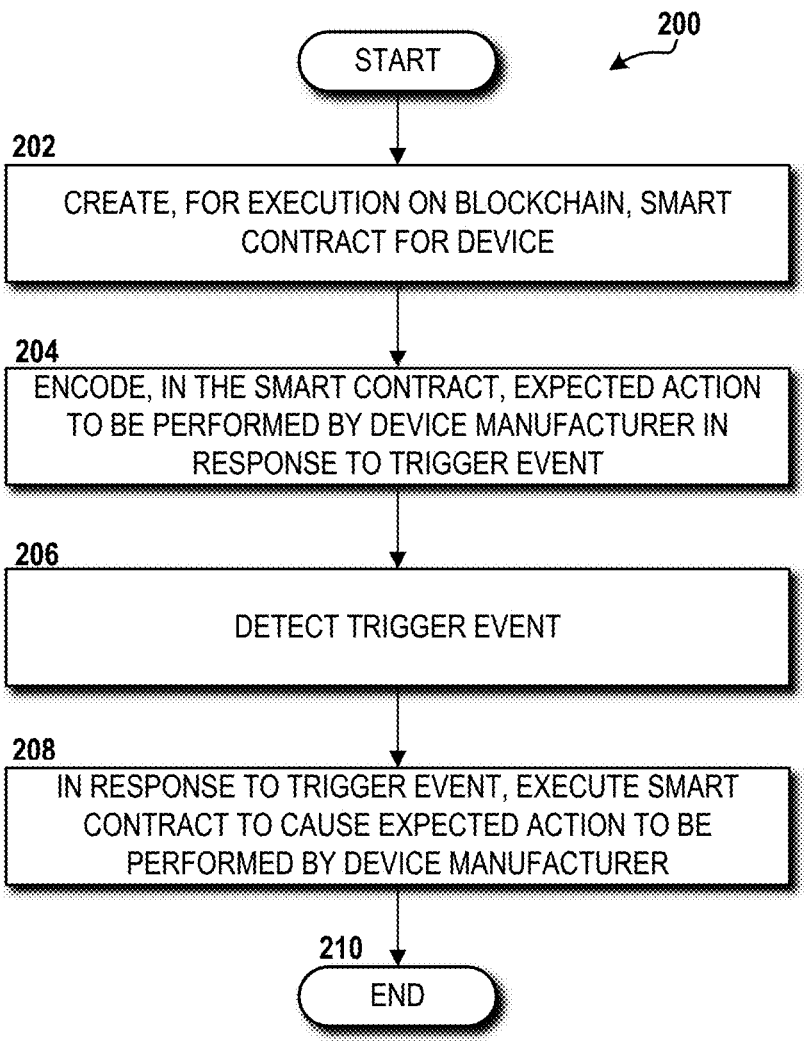
FIG. 2 is a flow diagram illustrating aspects of a method for security management of a device using blockchain technology, according to an embodiment.

Turning now to FIG. 2, a method 200 for security management of a device, such as the device 108, will be described, according to an exemplary embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the methods disclosed herein may be described as being performed, at least in part, by one of the processors via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202, where at least one of the computing systems 106 creates, for execution on the blockchain 104, the smart contract 102 for the device 108. In particular, the smart contract 102 can identify the parties to an agreement and the obligations of each. From operation 202, the method 200 proceeds to operation 204, where at least one of the computing systems 106 encodes, in the smart contract 102, one or more expected actions to be performed by the device manufacturer 110 in response to one or more trigger events, such as the discovery of a security vulnerability by the vulnerability assessor 114.

From operation 204, the method 200 proceeds to operation 206, where the smart contract 102 on the blockchain 104 detects a trigger event. From operation 206, the method 200 proceeds to operation 208, where, in response to the trigger event, at least one of the computing systems 106 can execute the smart contract 102 to cause one or more expected actions to be performed by the device manufacturer 110. From operation 208, the method 200 proceeds to operation 210, where the method 200 ends. It should be understood that after a trigger event has been detected, the smart contract 102 can continue monitoring for one or more additional trigger events based upon the specification of the smart contract 102 and can perform one or more expected action in response.

The device manufacturer 110 and the device customer 112 can have encoded in the smart contract 102 that if the vulnerability is not fixed within 24 hours (maybe after 24 hours it is published again by the vulnerability assessor 114), then an automatic action of payment, free service, discount, and/or some other form of compensation will be provided to the customer/user/service provider. In another example, if the customer device 112 reaches the agreed upon end-of-life (e.g., 3 years), then the device manufacturer 110 will be relieved in the smart contract 102 of any obligations regarding fixing vulnerabilities.

Figure 3:
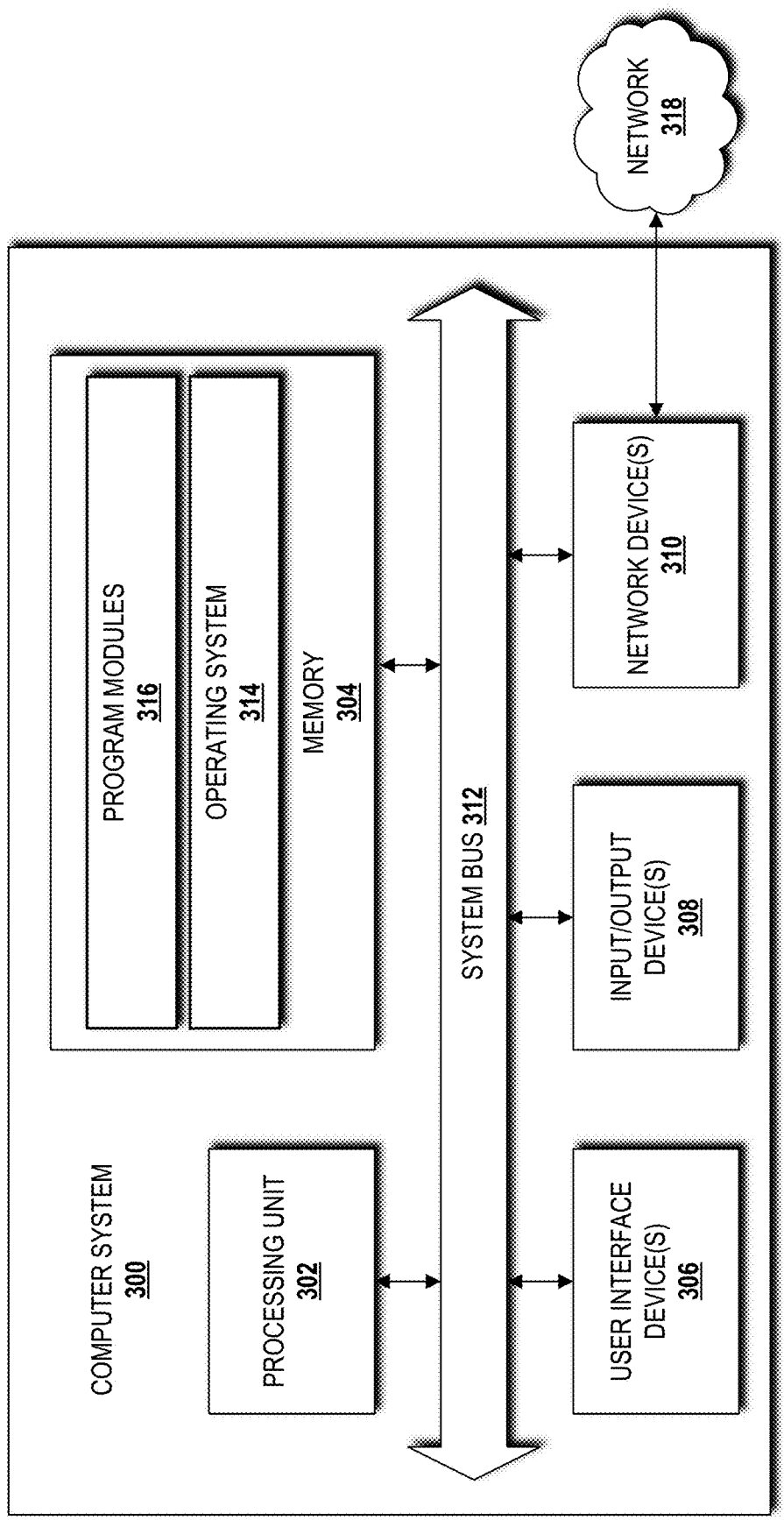
FIG. 3 is a block diagram illustrating an example computer system and components thereof capable of implementing aspects of the embodiments presented herein.

Turning now to FIG. 3 is a block diagram illustrating a computer system 300 configured to provide the functionality in accordance with various embodiments of the concepts and technologies disclosed herein. The systems, devices, and other components disclosed herein can utilize, at least in part, an architecture that is the same as or at least similar to the architecture of the computer system 300. For example, the computing system(s) 106, the device 108, one or more systems associated with the device manufacturer 110, and/or one or more systems associated with the vulnerability assessor 114 can utilize, at least in part, an architecture that is the same as or at least similar to the architecture of the computer system 300. It should be understood, however, that modification to the architecture may be made to facilitate certain interactions among elements described herein.

The computer system 300 includes a processing unit 302, a memory 304, one or more user interface devices 306, one or more I/O devices 308, and one or more network devices 310, each of which is operatively connected to a system bus 312. The bus 312 enables bi-directional communication between the processing unit 302, the memory 304, the user interface devices 306, the I/O devices 308, and the network devices 310. The aforementioned components can be included as part of the hardware 116 of the device 108 (see FIG. 1).

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The illustrated memory 304 includes an operating system 314 and one or more program modules 316 (which can be included in the software 120 and/or the firmware 118; see FIG. 1). The operating system 314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 316 may include various software and/or program modules to perform the various operations described herein. The program modules 316 and/or other programs can be embodied in computer-readable media containing instructions that, when executed by the processing unit 302, perform various operations such as those described herein. According to embodiments, the program modules 316 may be embodied in hardware, software, firmware, or any combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium" and variations thereof does not include waves or signals per se and/or communication media.

The user interface devices 306 may include one or more devices with which a user accesses the computer system 300. The user interface devices 306 may include, but are not limited to, computers, servers, personal digital assistant ("PDAs"), cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer. In some embodiments, the I/O devices 308 can be used for manual controls for operations to exercise under certain emergency situations.

The network devices 310 enable the computer system 300 to communicate with other networks or remote systems via a network 318. Examples of the network devices 310 include, but are not limited to, a modem, a radio frequency ("RF") or infrared ("IR") transceiver, a telephonic interface, a bridge, a router, or a network card. The network 318 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 318 may be or may include a wired network such as, but not limited to, a Wide Area Network ("WAN"), a wired Personal Area Network ("PAN"), or a wired Metropolitan Area Network ("MAN").

Figure 4:
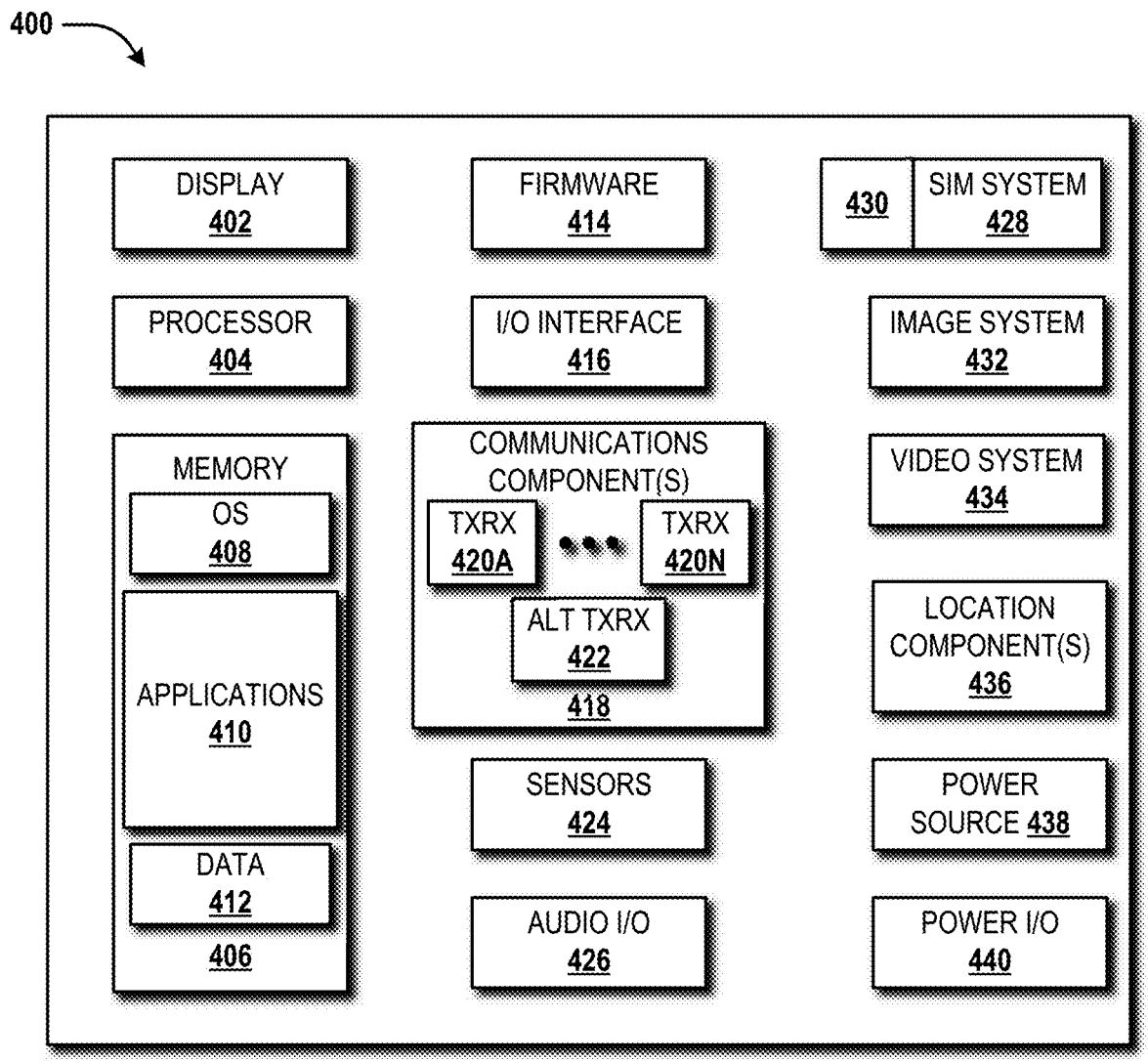
FIG. 4 is a block diagram illustrating an example mobile device and components thereof capable of implementing aspects of the embodiments presented herein.

Turning now to FIG. 4, an illustrative mobile device 400 and components thereof will be described. In some embodiments, the computing system(s) 106, the device 108, one or more systems associated with the device manufacturer 110, and/or one or more systems associated with the vulnerability assessor 114 can be configured like the mobile device 400. The hardware 116 of the device 108 (shown in FIG. 1) can include any of the hardware components described herein with reference to the components of the mobile device 400. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions (e.g., associated with the software 120) stored in the memory 406, or the like. In some embodiments, the applications 410 also can include a user interface ("UP") application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. According to various embodiments, the applications 410 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 410, the data 412, and/or portions thereof can be stored in the memory 406 and/or in a firmware 414 (e.g., including the firmware 118 of the device 108; see FIG. 1), and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as database data, location information, user information, organization information, presence status information, user IDs, passwords, and application initiation (start-up) requests. In some embodiments, the I/O interface 416 can include a hardwire connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ45) port, an RHO port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using Global System for Mobile communications ("GSM"), Code-Division Multiple Access ("CDMA") ONE, CDMA2000, Long-Term Evolution ("LTE"), and various other 2G, 2.5G, 3G, 4G, 5G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 418 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
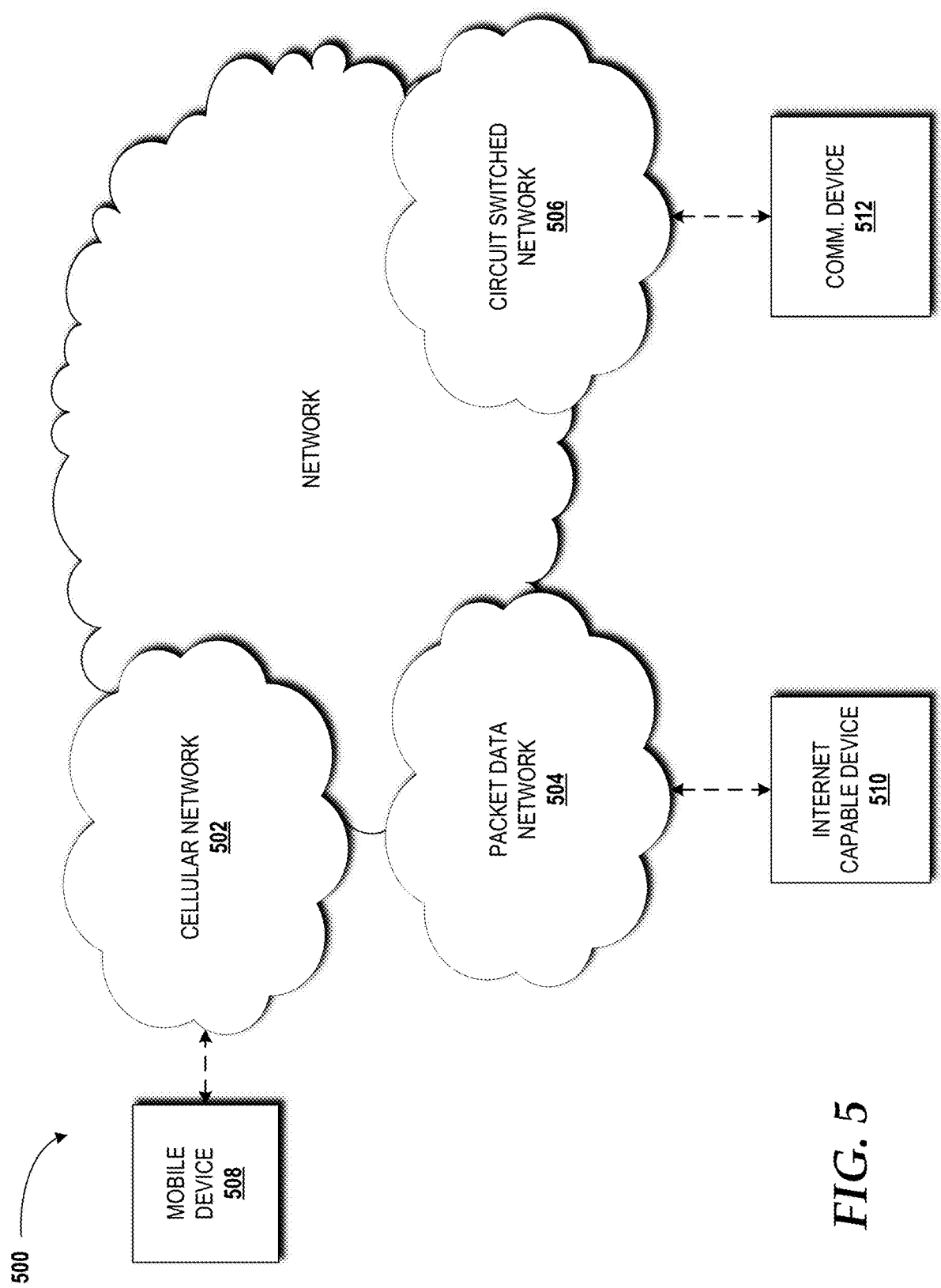
FIG. 5 is a block diagram illustrating an example network capable of implementing aspects of the embodiments presented herein.

Turning now to FIG. 5, details of a network 500 are illustrated, according to an illustrative embodiment. The network 500 includes a cellular network 502, a packet data network 504, and a circuit switched network 506, for example, a publicly switched telephone network ("PSTN").

The cellular network 502 includes various components such as, but not limited to, base transceiver stations ("BTSs"), nodeBs ("NBs"), eNBs, base station controllers ("BSCs"), radio network controllers ("RNCs"), mobile switching centers ("MSCs"), MMES, SGWs, PGWs, short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the device 108, a computing device, a cellular telephone, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, the computing system(s) 106, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 508 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and the circuit switched network 506, though it should be appreciated that this is not necessarily the case. One or more Internet-capable devices 510, for example, the device 108, the computing system(s) 106, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 500 is used to refer broadly to any combination of the networks 502, 504, 506. It should be appreciated that substantially all of the functionality described with reference to the network 500 can be performed by the cellular network 502, the packet data network 504, and/or the circuit switched network 508, alone or in combination with other networks, network elements, and the like.

Based on the foregoing, it should be appreciated that concepts and technologies directed to security management of devices using blockchain technology have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
creating, for execution on a blockchain, a smart contract for a device, wherein the smart contract identifies a plurality of parties comprising a device customer, a device manufacturer, and a vulnerability assessor;
encoding, in the smart contract, that the device customer is obligated to register the device with the device manufacturer;
encoding, in the smart contract, that the vulnerability assessor is obligated to report a discovery of a security vulnerability to the device customer and the device manufacturer;
encoding, in the smart contract, that the device manufacturer is under an obligation to perform a remediation action in response to the discovery of the security vulnerability;
encoding, in the smart contract, that if the device manufacturer does not perform the remediation action responsive to the discovery of the security vulnerability within a specified time period, the device manufacturer is obligated to provide the device customer with a form of compensation, wherein the form of compensation comprises a payment to the device customer, a free service to be provided to the device customer, or a discounted service to be provided to the device customer;
encoding, in the smart contract, that when the device reaches an end-of-life, then the device manufacturer will no longer be under the obligation to perform the remediation action; and
executing the smart contract, wherein executing the smart contract comprises
registering, by the device manufacturer, the device responsive to a request from the device customer,
reporting, by the vulnerability assessor, the discovery of the security vulnerability to the device customer and the device manufacturer,
in response to determining that the device manufacturer did not perform the remediation action responsive to the discovery of the security vulnerability within the specified time period, causing the device manufacturer to provide the device customer with the form of compensation, and in response to determining that the device has reached the end-of-life, relieving the device manufacturer of the obligation to perform the remediation action for addressing the security vulnerability.

2. The method of claim 1, wherein the security vulnerability involves a software application of the device.

3. The method of claim 1, wherein the security vulnerability involves an operating system of the device.

4. The method of claim 1, wherein the security vulnerability involves a firmware of the device.

5. The method of claim 1, wherein the security vulnerability involves a hardware component of the device.

6. A computer-readable storage medium comprising computer-executable instructions that, when executed by a processor of a computing system involved in a blockchain, cause the processor to perform operations comprising:

creating, for execution on the blockchain, a smart contract for a device, wherein the smart contract identifies a plurality of parties comprising a device customer, a device manufacturer, and a vulnerability assessor;

encoding, in the smart contract, that the device customer is obligated to register the device with the device manufacturer;

encoding, in the smart contract, that the vulnerability assessor is obligated to report a discovery of a security vulnerability to the device customer and the device manufacturer;

encoding, in the smart contract, that the device manufacturer is under an obligation to perform a remediation action in response to the discovery of the security vulnerability;

encoding, in the smart contract, that if the device manufacturer does not perform the remediation action responsive to the discovery of the security vulnerability within a specified time period, the device manufacturer is obligated to provide the device customer with a form of compensation, wherein the form of compensation comprises a payment to the device customer, a free service to be provided to the device customer, or a discounted service to be provided to the device customer;

encoding, in the smart contract, that when the device reaches an end-of-life, then the device manufacturer will no longer be under the obligation to perform the remediation action; and executing the smart contract, wherein executing the smart contract comprises registering, by the device manufacturer, the device responsive to a request from the device customer, reporting, by the vulnerability assessor, the discovery of the security vulnerability to the device customer and the device manufacturer, in response to determining that the device manufacturer did not perform the remediation action responsive to the discovery of the security vulnerability within the specified time period, causing the device manufacturer to provide the device customer with the form of compensation, and in response to determining that the device has reached the end-of-life, relieving the device manufacturer of the obligation to perform the remediation action for addressing the security vulnerability.

7. The computer-readable storage medium of claim 6, wherein the security vulnerability involves a software application of the device.

8. The computer-readable storage medium of claim 6, wherein the security vulnerability involves an operating system of the device.

9. The computer-readable storage medium of claim 6, wherein the security vulnerability involves a firmware of the device.

10. The computer-readable storage medium of claim 6, wherein the security vulnerability involves a hardware component of the device.

11. A computing system comprising:

a processor; and memory comprising computer-executable instructions that, when executed by the processor, cause the processor to perform operations comprising creating, for execution on a blockchain, a smart contract for a device, wherein the smart contract identifies a plurality of parties comprising a device customer, a device manufacturer, and a vulnerability assessor, encoding, in the smart contract, that the device customer is obligated to register the device with the device manufacturer, encoding, in the smart contract, that the vulnerability assessor is obligated to report a discovery of a security vulnerability to the device customer and the device manufacturer, encoding, in the smart contract, that the device manufacturer is under an obligation to perform a remediation action in response to the discovery of the security vulnerability, encoding, in the smart contract, that if the device manufacturer does not perform the remediation action responsive to the discovery of the security vulnerability within a specified time period, the device manufacturer is obligated to provide the device customer with a form of compensation, wherein the form of compensation comprises a payment to the device customer, a free service to be provided to the device customer, or a discounted service to be provided to the device customer, encoding, in the smart contract, that when the device reaches an end-of-life, then the device manufacturer will no longer be under the obligated to perform the remediation action, and executing the smart contract, wherein executing the smart contract comprises registering, by the device manufacturer, the device responsive to a request from the device customer, reporting, by the vulnerability assessor, the discovery of the security vulnerability to the device customer and the device manufacturer, in response to determining that the device manufacturer did not perform the remediation action responsive to the discovery of the security vulnerability within the specified time period, causing the device manufacturer to provide the device customer with the form of compensation, and in response to determining that the device has reached the end-of-life, relieving the device manufacturer of the obligation to perform the remediation action for addressing the security vulnerability.

12. The computing system of claim 11, wherein the security vulnerability involves a software application of the device, an operating system of the device, a firmware of the device, or a hardware component of the device.

\* \* \* \* \*